US009544979B2

(12) United States Patent
Sako et al.

(10) Patent No.: US 9,544,979 B2
(45) Date of Patent: Jan. 10, 2017

(54) AUDIO ILLUMINATION APPARATUS AND STORAGE MEDIUM

(71) Applicant: SONY CORPORATION, Tokyo (JP)

(72) Inventors: Yoichiro Sako, Tokyo (JP); Hiroshi Okada, Kanagawa (JP); Kazuhiro Watanabe, Tokyo (JP); Kazuyuki Sakoda, Chiba (JP); Kohei Asada, Kanagawa (JP); Mitsuru Takehara, Tokyo (JP); Takatoshi Nakamura, Kanagawa (JP); Yasunori Kamada, Kanagawa (JP); Takayasu Kon, Tokyo (JP); Kazunori Hayashi, Tokyo (JP); Akira Tange, Tokyo (JP); Hiroyuki Hanaya, Kanagawa (JP); Yuki Koga, Tokyo (JP); Tomoya Onuma, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 392 days.

(21) Appl. No.: 14/046,009

(22) Filed: Oct. 4, 2013

(65) Prior Publication Data

US 2014/0125451 A1     May 8, 2014

(30) Foreign Application Priority Data

Nov. 5, 2012   (JP) ................ 2012-243260

(51) Int. Cl.
   *H04L 7/00*        (2006.01)
   *H05B 37/02*     (2006.01)

(52) U.S. Cl.
   CPC ........ *H05B 37/029* (2013.01); *H05B 37/0227* (2013.01)

(58) Field of Classification Search
   CPC .............. H05B 37/0227; H05B 37/029; H05B 37/0272; H05B 37/0218; H05B 37/0812; H05B 37/0857; H05B 37/0863; H05B 37/0236; G05B 1/01
See application file for complete search history.

(56) References Cited

U.S. PATENT DOCUMENTS

| 8,489,119 | B1 * | 7/2013 | Fraccaroli | ............... H04W 4/02 379/201.06 |
| 2003/0227439 | A1 * | 12/2003 | Lee | .................... G06K 9/00221 345/156 |
| 2005/0275716 | A1 * | 12/2005 | Shingu | .............. G06F 17/30056 348/14.13 |

(Continued)

FOREIGN PATENT DOCUMENTS

| JP | 2002-129765 A | 5/2002 |
| JP | 2008-035133 A | 2/2008 |

*Primary Examiner* — Kerri McNally
*Assistant Examiner* — Renee Dorsey
(74) *Attorney, Agent, or Firm* — Chip Law Group

(57) ABSTRACT

There is provided an audio illumination apparatus including an illumination unit, an audio output unit, a setting unit configured to set a parameter of at least one of illumination of the illumination unit and audio output of the audio output unit in accordance with a recognized user who is in a neighborhood, a transmission unit configured to transmit the parameter set by the setting unit to an audio illumination apparatus in the neighborhood, and a control unit configured to control the at least one of the illumination of the illumination unit and the audio output of the audio output unit in accordance with the set parameter.

19 Claims, 10 Drawing Sheets

(56) References Cited

U.S. PATENT DOCUMENTS

| | | | | |
|---|---|---|---|---|
| 2010/0201267 A1* | 8/2010 | Bourquin | ............ | H05B 37/0245 |
| | | | | 315/32 |
| 2011/0133655 A1* | 6/2011 | Recker | ...................... | H02J 9/02 |
| | | | | 315/159 |

* cited by examiner

AUDIO ILLUMINATION APPARATUS AND STORAGE MEDIUM

CROSS REFERENCE TO RELATED APPLICATIONS

This application claims the benefit of Japanese Priority Patent Application JP 2012-243260 filed Nov. 5, 2012, the entire contents of which are incorporated herein by reference.

BACKGROUND

The present disclosure relates to an audio illumination apparatus and a storage medium.

Generally speaking, illumination apparatuses installed in buildings are turned on/off by administrators and users. Such illumination apparatuses that are turned on when sensing guests coming in combination with motion sensors have been known as illumination apparatuses that are automatically turned on/off.

In recent years, an apparatus has been proposed that has an illumination apparatus and a speaker integrated with each other. In this way, users do not have to make room for a speaker by integrating a speaker (audio output apparatus) with an illumination apparatus, which is installed in a building in most cases. Accordingly, spaces can be effectively used.

For example, JP 2008-35133T discloses a speaker apparatus including an illumination cabinet integrally attached under a speaker cabinet that hangs from the ceiling, the speaker cabinet including multiple speakers at a substantial angle of 45 degrees such that the multiple speakers are directed toward the ceiling. The speaker apparatus receives audio signals from an audio main body, and reproduces the audio signals from the speakers included in the speaker cabinet. The speaker apparatus can provide an audio environment according to a luminous intensity of illumination by controlling an amplification level of an amplifier in conjunction with a light quantity level of the illumination. A sound volume of the speakers are hereby lowered, for example, when a listener makes a room darker than a given level in order to sleep.

JP 2002-129765A is introduced as a system for controlling an illumination and audio environment in accordance with a preference of an individual. Specifically, JP 2002-129765A discloses a control method for a work space system, the control method including controlling an illumination environment, a scent environment, and an audio environment in a private room in order to improve efficiency in the private room, in accordance with environmental conditions that have been associated in advance with an individual identification number input by the individual.

SUMMARY

However, although JP 2008-35133T certainly discloses that a sound volume of speakers are controlled in conjunction with a luminous intensity of illumination, nothing is mentioned in that a listener is identified, and music and illumination according to, for example, a preference of the individual listener are controlled.

To the contrary, JP 2002-129765A discloses that an illumination environment, a scent environment, and an audio environment in a private room are controlled in accordance with a preference of an individual. However, according to the control method described in JP 2002-129765A, an individual who uses a private room has to manually input an individual identification number. Nothing is mentioned in that music and illumination according to a preference of the individual and the like are automatically controlled. In addition, the control method described in JP 2002-129765A is a method for controlling an illumination environment and an audio environment in a private room. That is, it has not been presupposed that environmental conditions according to the preference of the individual are transmitted to another private room or another space.

The present disclosure therefore proposes an audio illumination apparatus and a storage medium that are novel and improved, and can provide an audio/illumination space according to an individual user by having multiple audio illumination apparatuses cooperate with each other.

According to an embodiment of the present disclosure, there is provided an audio illumination apparatus including an illumination unit, an audio output unit, a setting unit configured to set a parameter of at least one of illumination of the illumination unit and audio output of the audio output unit in accordance with a recognized user who is in a neighborhood, a transmission unit configured to transmit the parameter set by the setting unit to an audio illumination apparatus in the neighborhood, and a control unit configured to control the at least one of the illumination of the illumination unit and the audio output of the audio output unit in accordance with the set parameter.

According to another embodiment of the present disclosure, there is provided a non-transitory computer readable storage medium having a program stored therein, the program causing a computer to function as an illumination unit, an audio output unit, a setting unit configured to set a parameter of at least one of illumination of the illumination unit and audio output of the audio output unit in accordance with a recognized user who is in a neighborhood, a transmission unit configured to transmit the parameter set by the setting unit to an audio illumination apparatus in the neighborhood, and a control unit configured to control the at least one of the illumination of the illumination unit and the audio output of the audio output unit in accordance with the set parameter.

According to one or more of embodiments of the present disclosure, it is possible to provide an audio/illumination space according to an individual user by having multiple audio illumination apparatuses cooperate with each other.

DETAILED DESCRIPTION OF THE EMBODIMENT(S)

Figure 1:
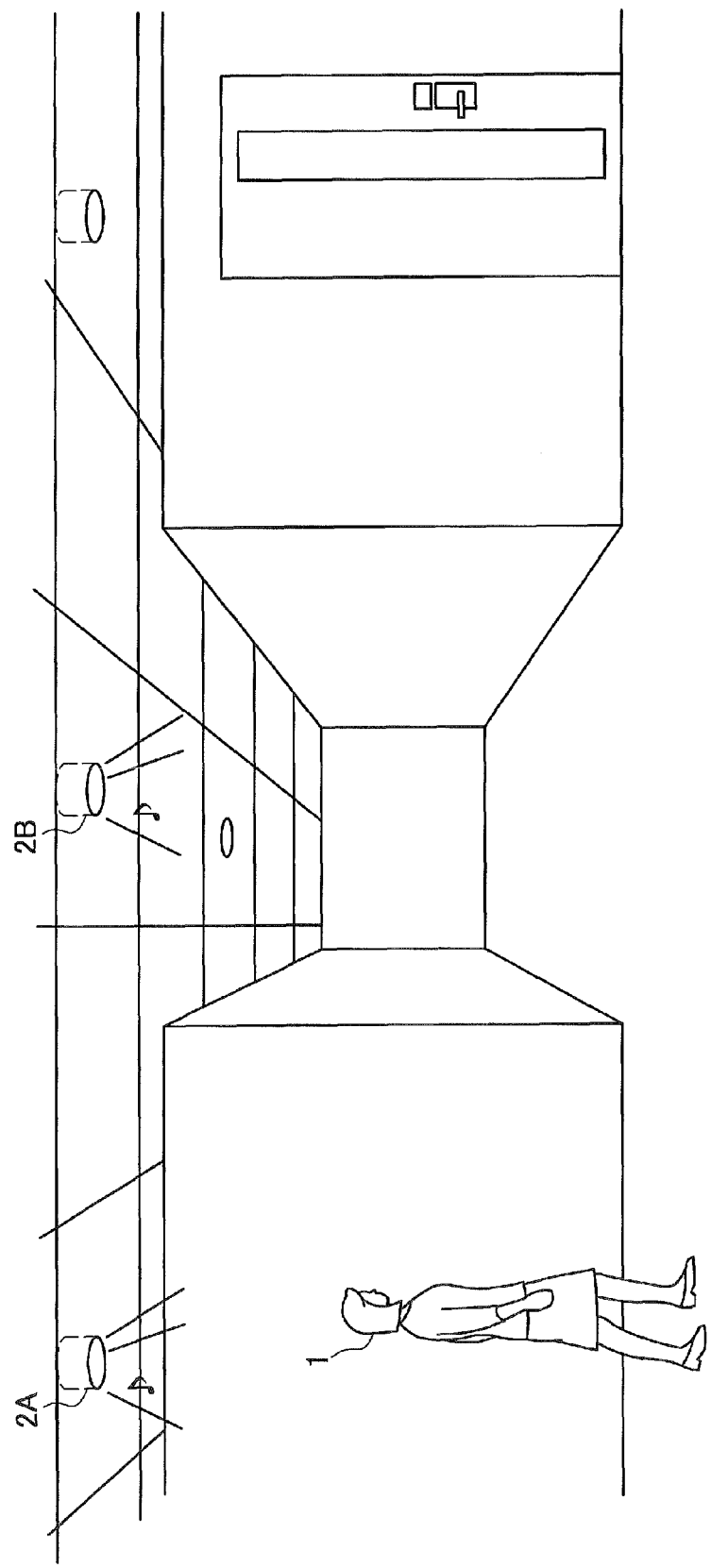
FIG. 1 is a diagram for describing an overview of an audio/illumination control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Audio/Illumination Control System according to Embodiment of Present Disclosure
2. First Embodiment
   2-1. Configuration Example of Device
   2-2. Operational Process
3. Second Embodiment
4. Conclusion

1. Overview of Audio/Illumination Control System According to Embodiment of Present Disclosure First, with reference to FIG. 1, an overview of an audio/illumination control system according to an embodiment of the present disclosure will be described.

FIG. 1 is a diagram for describing an overview of an audio/illumination control system according to an embodiment of the present disclosure. As illustrated in FIG. 1, devices 2A and 2B (that will also be generically referred to as (a) device(s) 2, hereinafter) according to the present embodiment are disposed, for example, on the ceiling of a passage. The device 2 is an audio illumination apparatus having an audio output function and an illumination function, and can provide a comfortable audio illumination space to a user 1 by performing audio/illumination control in accordance with the user 1, who is recognized as being present in the neighborhood of the audio/illumination apparatus. Specifically, the device 2 reproduces music according to a preference of the user 1, illuminates the passage with light quantity and a color according to the preference, and the like, thereby providing a comfortable audio illumination space. Additionally, if the device 2 fails to recognize the user 1, the device 2 may perform audio/illumination control set by default while the device 2 may be switched to perform audio/illumination control according to the user when the device 2 recognizes the user 1.

If the device 2A transmits parameters of audio output and illumination according to the user to a device such as the device 2B in the neighborhood, the multiple devices 2 can cooperate with each other to perform audio/illumination control according to the user 1. The device 2A may transmit a parameter to the device 2 disposed on the route in accordance with a destination of the user 1. Accordingly, each device 2 can guide the user 1 by using music and illumination.

The device 2 may also include a sensor such as an image sensor and a microphone to detect a person and further recognize (identify) a user.

Additionally, the devices 2 illustrated in FIG. 1 are downlights embedded into the ceiling, but the audio/illumination apparatus according to the present embodiment is not limited thereto. For example, the audio/illumination apparatus according to the present embodiment may be a stand light or a table lamp.

Figure 2:
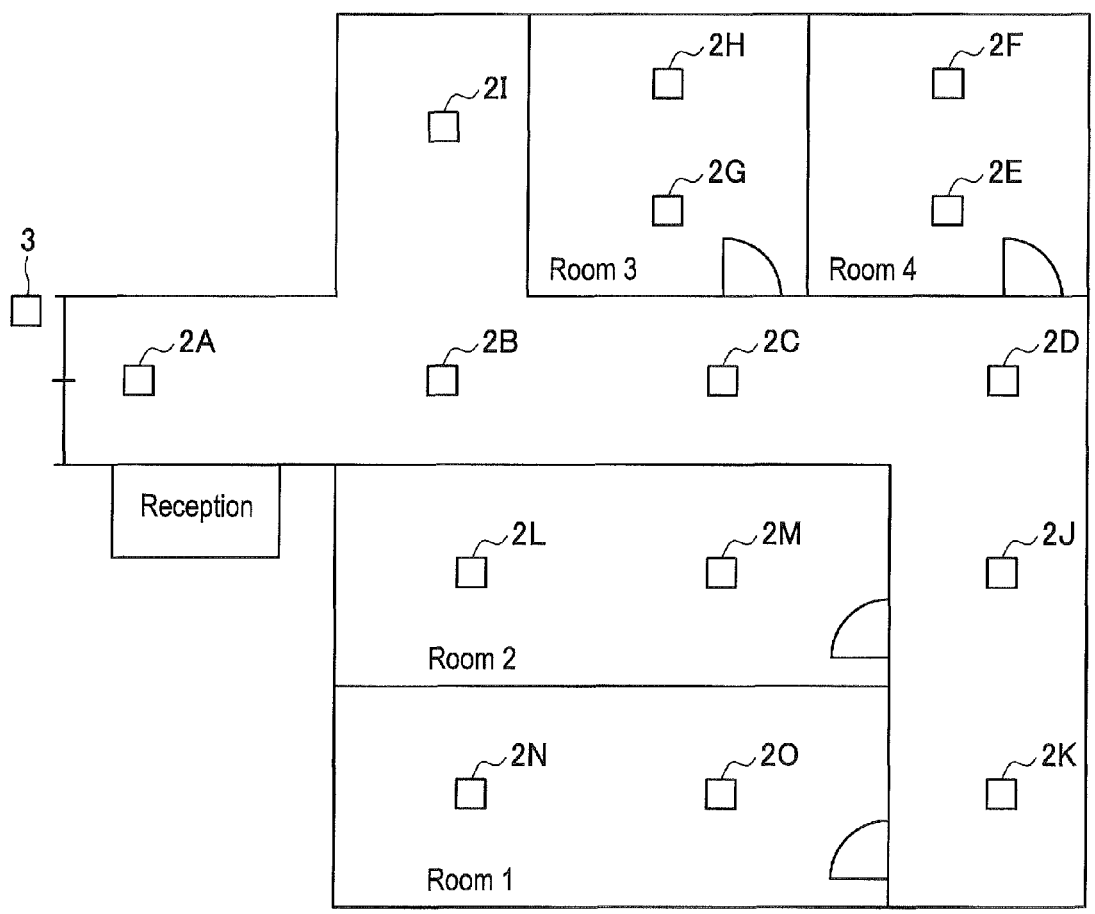
FIG. 2 is a diagram for describing an example of disposition positions of multiple devices 2 according to the present embodiment.

In the example illustrated in FIG. 1, the disposition of the multiple devices 2 in a part of a building, which is seen in a substantially horizontal direction, is shown. Meanwhile, with reference to FIG. 2, an example of the disposition of the multiple devices 2 all over the floor of the building will be described. FIG. 2 is a diagram for describing an example of disposition positions of the multiple devices 2 disposed all over the floor of the building.

As illustrated in FIG. 2, devices 2A, 2B, 2C, 2D, 2I, 2J, and 2K are disposed along a passage at predetermined intervals. The multiple devices 2 are also disposed in each meeting room. Specifically, as illustrated in FIG. 2, a ROOM 1 has devices 2N and 2O disposed therein, a ROOM 2 has devices 2L and 2M disposed therein, a ROOM 3 has devices 2H and 2G disposed therein, and a ROOM 4 has devices 2F and 2E disposed therein. A motion sensor 3 is disposed outside the entrance near reception. The motion sensor 3 detects an incoming guest, and reports guest data to the device 2A. The device 2 according to the present embodiment may substitute for the motion sensor 3.

The devices 2A to 2O illustrated in FIG. 2 form a mesh network by performing wired/wireless communication with each other.

Accordingly, if the user 1 comes, for example, from the entrance, the device 2A performs audio/illumination control according to the user 1, first of all. In addition, the device 2A transmits a parameter of the audio/illumination control to the device 2B in the neighborhood substantially at the same time. The device 2B performs illumination/audio control in accordance with the received parameter. In addition, the device 2B transfers the same parameter to the devices 2C and 2I in the neighborhood substantially at the same time. In this way, each device 2 transfers the parameter one by one while each device 2 performs audio/illumination control in accordance with the parameter. The multiple devices 2 can hereby perform audio/illumination control according to the user 1 in cooperation with each other.

As above, the overview of the audio/illumination control system according to the embodiment of the present disclosure has been described. Next, multiple embodiments will be used to describe the audio/illumination control system according to the present embodiment in detail.

2. First Embodiment

2-1. Configuration Example of Device

Figure 3:
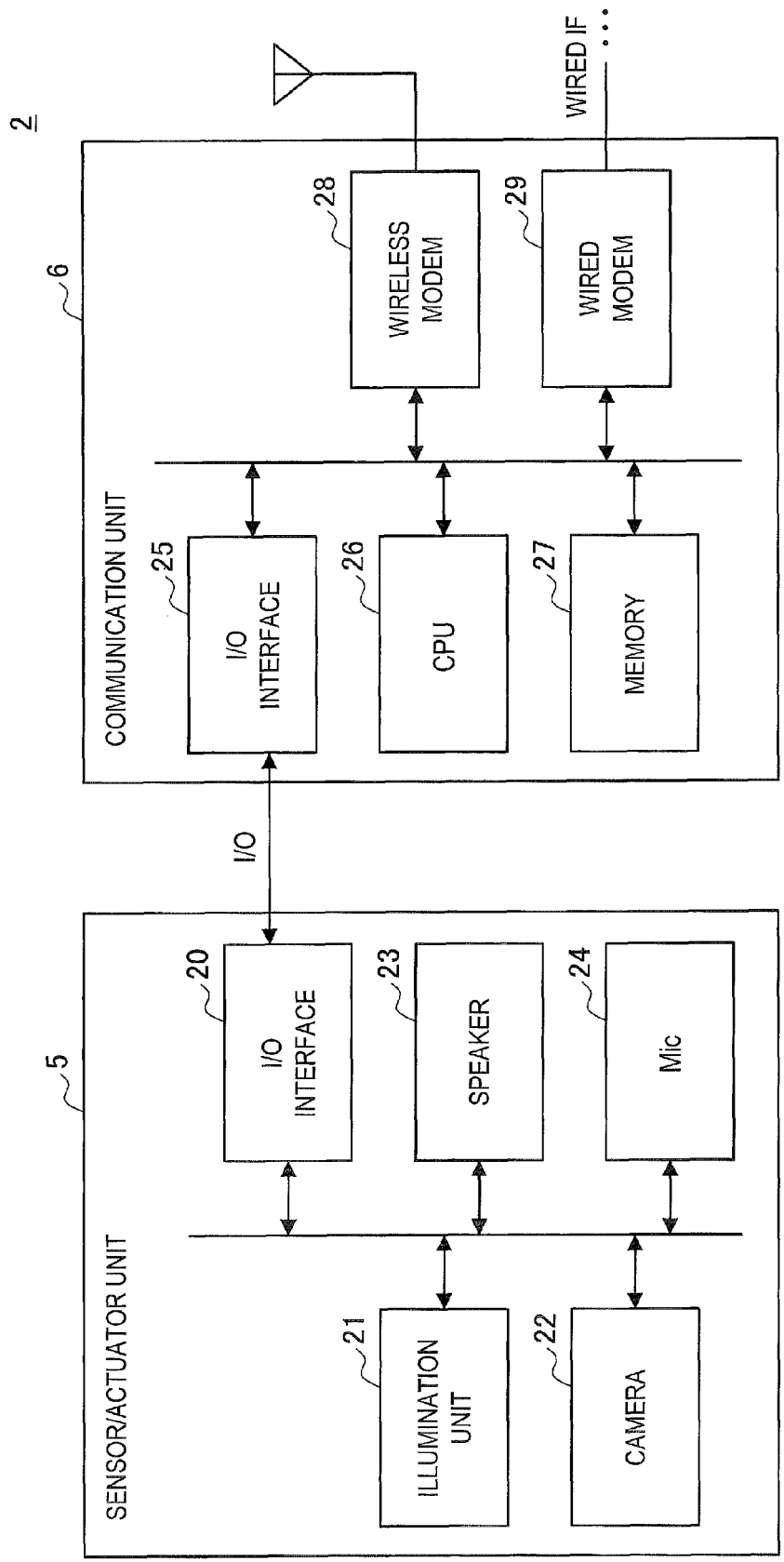
FIG. 3 is a block diagram for describing a configuration of a device according to a first embodiment.

FIG. 3 is a block diagram for describing a configuration of a device according to the present embodiment. As illustrated in FIG. 3, the device 2 according to the present embodiment includes a sensor/actuator unit 5 and a communication unit 6. The sensor/actuator unit 5 and the communication unit 6 can input data to and output data from each other.

(Sensor/Actuator Unit)

The sensor/actuator unit 5 includes an I/O interface 20, an illumination unit 21, a camera 22, a speaker 23, and Mic (microphone) 24, which are connected to an internal bus.

The sensor/actuator unit 5 controls an actuator such as the illumination unit 21 and the speaker 23 in accordance with an instruction input from the communication unit 6 via the I/O interface 20, and provides an audio/illumination space according to the user 1.

Specifically, the illumination unit 21 has a function of emitting light in accordance with control performed by the sensor/actuator unit 5. The illumination unit 21 is, for example, a light emitting diode (LED) lamp, an incandescent lamp, or a high intensity discharge (HID) lamp. The speaker 23 is an audio output unit for audio output (outputting audio signals). The speaker 23 includes an amplifier that amplifies audio signals, and a DAC that converts digital signals to analog signals.

The sensor/actuator unit 5 further outputs signals acquired from a sensor such as the camera 22 and the Mic 24 to the communication unit 6 via the I/O interface 20. The signals acquired from such a sensor are used for detecting a person or recognizing (identifying) the user 1. A sensor (motion sensor) mounted on the sensor/actuator unit 5 may be any of the camera 22 and the Mic 24, or another motion sensor.

Specifically, the camera 22 includes an image sensor, an imaging optical system including an imaging lens, and a captured image signal processing unit, and is an imaging unit that outputs data of a captured image converted to digital signals. Additionally, the image sensor is, for example, a charge coupled device (CCD) imager or a complementary metal oxide semiconductor (CMOS) imager. The Mic 24 is a sound collection unit that collects sounds in the neighborhood, and outputs audio data converted to digital signals.

Additionally, the sensor/actuator unit 5 illustrated in FIG. 3 is exemplified as having the illumination unit 21, the camera 22, the speaker 23, and the Mic 24 mounted thereon. However, another sensor and another actuator, or only an actuator may also be mounted on the sensor/actuator unit 5.

(Communication Unit)

The communication unit 6 includes an I/O interface 25, a CPU 26, memory 27, a wireless modem 28, and a wired modem 29, which are connected to an internal bus.

The wireless modem 28 is a module used for transmitting and receiving radio waves. Specifically, the wireless modem 28 transmits and receives radio waves by using, for example, a wireless LAN, Bluetooth (registered trademark), or Wi-Fi. The wired modem 29 is a module used for transmitting and receiving signals through a cable. After each modem converts, to a format or the like of a communication scheme for transmission, a transmission packet that the CPU 26 has generated and transmitted, each modem transmits the format to an external apparatus, for example, through an antenna/wired interface. Each modem performs signal processing on radio signals received through the antenna and reception signals received through the wired interface, extracts a reception packet, and transmits the reception packet to the CPU 26.

In the example illustrated in FIG. 3, the communication unit 6 has two types of modems mounted thereon. However, the communication unit 6 according to the present embodiment may have only the wireless modem 28 mounted thereon. Alternatively, the communication unit 6 according to the present embodiment may have only the wired modem 29 mounted thereon.

The memory 27 stores information necessary for operating the device 2. Specifically, the memory 27 stores various programs used for operating the CPU 26, and various parameters for illumination and sounds according to a preference of a user. The memory 27 may also store information indicating a destination of a user (which meeting room a user is going to).

The I/O interface 25 inputs data to and outputs data from the sensor/actuator unit 5. Specifically, the I/O interface 25 outputs an instruction to the sensor/actuator unit 5 in accordance with control performed by the CPU 26. The I/O interface 25 also receives signals acquired from a sensor of the sensor/actuator unit 5.

The CPU 26 is a control unit that issues instructions to the respective configurations of the devices 2, and controls all the devices 2. Specifically, the CPU 26 processes data input from the sensor/actuator unit 5 via the I/O interface 25 and data transmitted from an external apparatus (including another device 2) via the wireless modem 28 or the wired modem 29.

The CPU 26 also processes, for example, information read out from the memory 27 and signals input from the I/O interface 25, and generates a chunk (packet) of data that is to be transmitted to an external apparatus.

In addition, the CPU 26 interprets a reception packet extracted by each modem, and transfers the data to the memory 27 if the interpretation result shows that the data should be held. In the contrary, the interpretation result shows that the data should be transferred to another communication apparatus (another device 2), the CPU 26 transfers the data again to each modem as a transmission packet. If the interpretation result shows that the data should be transferred to an actuator, the data is transferred from the I/O interface 26 to the sensor/actuator unit 5.

As above, the internal configuration of the device 2 according to the present embodiment has been described. According to the above-described configuration, the device 2 can perform information processing on information acquired from a sensor in the CPU 26. The information can be further transferred to another device. The device 2 can perform information processing on the basis of signals transferred from another device to operate the actuator. The device 2 can further transfer the signals transferred from the other device to still another device.

(Functional Configuration of CPU)

Figure 4:
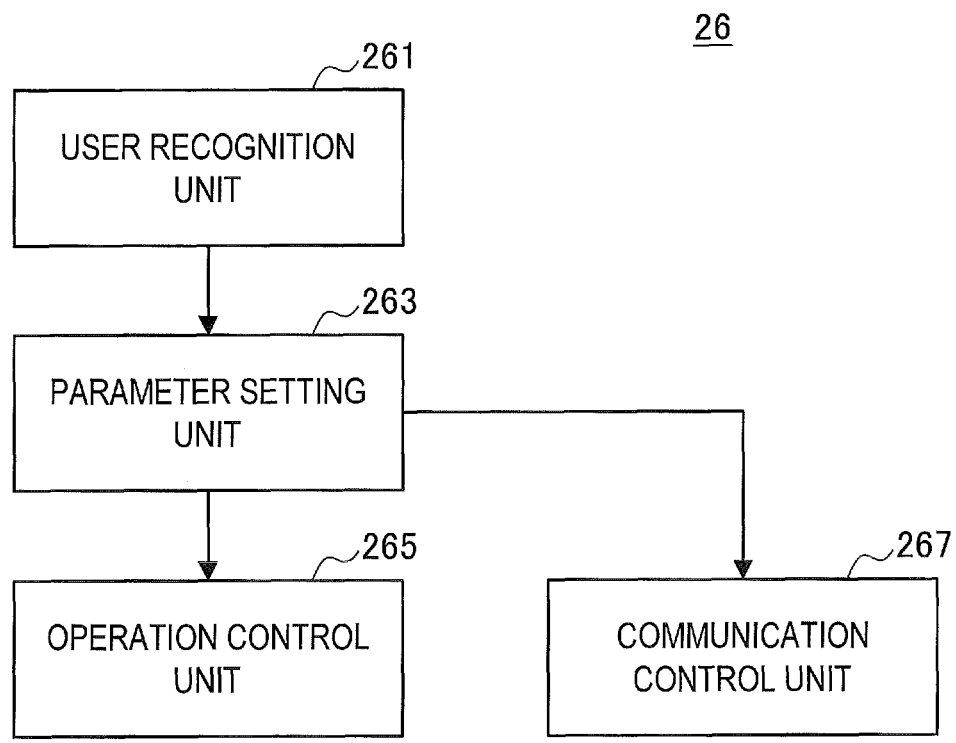
FIG. 4 is a block diagram illustrating a functional configuration of a CPU according to the first embodiment.

Next, with reference to FIG. 4, a specific functional configuration of the CPU 26 will be described. FIG. 4 is a block diagram illustrating a functional configuration of the CPU 26. As illustrated in FIG. 4, the CPU 26 according to the present embodiment functions as a user recognition unit 261, a parameter setting unit 263, an operation control unit 265, and a communication control unit 267.

The user recognition unit 261 recognizes (identifies) a user who is in the neighborhood of the device 2, on the basis of signals acquired from a sensor such as the camera 22 and the Mic 24. For example, the user recognition unit 261 performs face recognition on the basis of a captured image captured by the camera 22 to recognize a user. The user recognition unit 261 may also perform sound recognition or speaker recognition on the basis of sound collection data (audio data) collected by the Mic 24 to recognize a user. The user recognition unit 261 may identify, for example, sex, age, and a characteristic of appearance of a user. Alternatively, the user recognition unit 261 may identify an individual with reference to personal information (such as a face image, a name, and a quality of a voice) of a registered user, which has been stored in the memory 27 in advance.

The parameter setting unit 263 sets a parameter of at least one of audio output or illumination according to a user who is in the neighborhood of the device 2 and recognized by the user recognition unit 261. Specifically, the parameter setting unit 263 may set, for example, on the basis of information stored in the memory 27, an audio/illumination parameter according to a preference of a recognized user or an audio/illumination parameter according to sex, age, nationality, race, and the like of a user. If multiple users are recognized, the parameter setting unit 263 may further set an audio/illumination parameter according to a user having higher priority than the other users' priority, which has been set in advance. For example, priority of each user may be set in accordance with whether the user is male or female, how old the user is, whether the user is a guest or a worker for the company, whether the user is registered or not, or what kind of post the user holds in the company.

For example, at least one of a timbre, sound intensity, pitch, a tempo, equalizing, a genre of music, a specific musical composition, directivity of the speaker 23 (presence of directivity), and a sound volume is set as a parameter of audio output. If the speaker 23 is directional, an orientation of the directivity of the speaker 23 is set to be directed toward a user so that only the user can listen to a preferred composition.

For example, at least one of an illumination pattern, a color, and a luminous intensity is set as a parameter of illumination.

An audio/illumination parameter may further include a time code that allows the multiple devices 2 to synchronize timing for starting audio output and illumination, and a time code that allows the multiple devices 2 to synchronize with each other in the middle of music or an illumination pattern. The device 2 can perform audio/illumination control in cooperation with the other devices 2 in the neighborhood by starting the audio/illumination control at predetermined timing in accordance with the time code or synchronizing the audio/illumination control with audio/illumination control of the other devices 2.

The operation control unit 265 controls an operation of an actuator such as the speaker 23 and the illumination unit 21 in accordance with an audio/illumination parameter set by the parameter setting unit 263. Specifically, the operation control unit 265 outputs an instruction to the actuator such that the actuator operates in accordance with the parameter. The operation control unit 265 may extract, from the memory 27, audio signals that operate the actuator in accordance with the parameter, and output the audio signals to the speaker 23.

Additionally, the operation control unit 265 may control an operation of an actuator such as the speaker 23 and the illumination unit 21 in accordance with an audio/illumination parameter received from another device 2.

The communication control unit 267 performs control such that an audio/illumination parameter set by the parameter setting unit 263 is transmitted to another device 2. Specifically, the communication control unit 267 performs control such that the wireless modem 28 or the wired modem 29 transmits an audio/illumination parameter to another device 2 in the neighborhood.

2-2. Operational Process

Figure 5:
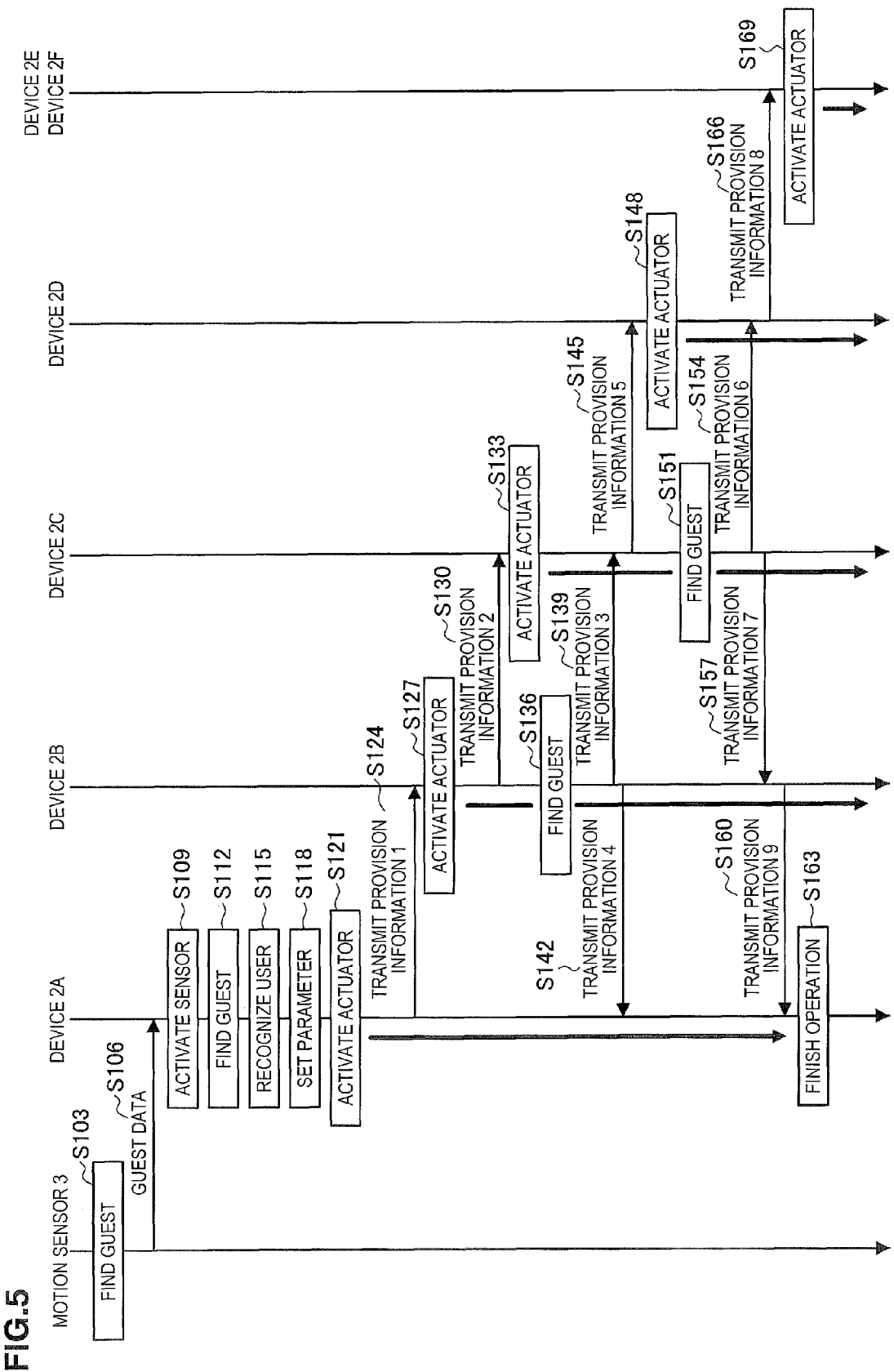
FIG. 5 is a flowchart illustrating an operational process of an audio/illumination control system according to the first embodiment.

Next, with reference to FIG. 5, as an operational process according to a first embodiment, an operational process of an audio/illumination control system will be described that includes the motion sensor 3 and the devices 2A to 2O disposed all over the floor in the building, as illustrated in FIG. 2. FIG. 5 is a flowchart illustrating an operational process of an audio/illumination control system according to the first embodiment.

As illustrated in FIG. 5, first, in step S103, the motion sensor 3 continuously captures an area near the entrance, and detects a person (finds a person) on the basis of a captured image. Additionally, the motion sensor 3 may continuously collect sounds in the neighborhood, and may find a guest on the basis of the audio data. Alternatively, the motion sensor 3 may find a guest by using infrared radiation. As described above, the device 2 may also be used as the motion sensor 3 in the audio/illumination control system according to the present embodiment.

Subsequently, in step S106, the motion sensor 3 reports a guest finding event to the device 2A in the neighborhood. Specifically, the motion sensor 3 transmits guest data to the device 2A. The guest data may include data (such as a captured image and audio data) of a guest acquired by the motion sensor 3.

Next, in step S109, the device 2A, which has received the guest data, recognizes that the guest would come, and activates a sensor (such as the camera 22) of the device 2A. Furthermore, the device 2A stores the received guest data in the memory 27.

Next, in step S112, the device 2A finds the guest coming from the entrance, on the basis of a captured image captured by the activated camera 22.

Subsequently, in step S115, the user recognition unit 261 of the device 2A recognizes who the guest (user) is, on the basis of the captured image.

Next, in step S118, the parameter setting unit 263 of the device 2A extracts, from the memory 27, information indicating what type of sounds and illumination is output for the guest recognized by the user recognition unit 261, and sets an audio/illumination parameter.

Subsequently, in step S121, the operation control unit 265 of the device 2A activates an actuator (such as the illumination unit 21 and the speaker 23) of the device 2A, and controls an operation of the actuator in accordance with a parameter set by the parameter setting unit 263. The device 2A can hereby output sounds and illumination according to the guest. Additionally, musical content that the speaker 23 reproduces is stored not only in the memory 27 of the device 2A, but may also be transferred and acquired from another device 2.

Next, in step S124, the communication control unit 267 of the device 2A transmits, to another device 2 in the neighborhood, the audio/illumination parameter set by the parameter setting unit 263 as provision information along with a command for activating an actuator. The other device 2 in the neighborhood, which has received the parameter, controls an operation of an actuator in accordance with the received parameter, and transfers the parameter to still another device 2 in the neighborhood. Such processes are performed among the multiple devices 2, which form a mesh network. Consequently, the multiple devices 2 can provide an audio/illumination environment according to a user in cooperation with each other.

The audio/illumination control system according to the present embodiment may limit a range in which an audio/illumination parameter is transferred. For example, it may be set how many other devices 2 an audio/illumination parameter and an activation command/deactivation command of an actuator are transferred to. Alternatively, it may be set to transfer a parameter and an activation/deactivation command of an actuator to the other devices 2 on the route according to a destination of a recognized guest (where the guest is going). As an example, let us assume below that each device 2 is set to transfer a parameter and an activation/ deactivation command of an actuator to two or less of the other devices 2 disposed in the neighborhood, and a guest is going to a meeting room 4.

In that case, the device 2A searches for route information indicating which other devices 2 are used on the route to the meeting room 4. A search method is not particularly limited. However, for example, a commonly known technique may be used as a route search function included in a mesh network. As a result of the search, it is found that a guest passes under the device 2A, the device 2B, the device 2C, the device 2D, the device 2E, and the device 2F on the route to the meeting room 4. At least a part of the route information indicating this route is held by each device 2 as route information regarding the guest, and will be used later when each device 2 transfers provision information to another device 2.

Once the route information is known, the device 2A transmits provision information 1 that includes a command for activating an actuator and an illumination/control parameter to another device 2B, which is present on the route to the meeting room 4, in the neighborhood (FIG. 5, step S124). The provision information according to the present embodiment may include counter information (time to live: TTL) indicating how many times the provision information should be further transferred (transfer number limit). Each device 2 decrements the value each time provision information is transferred. For example, if each device 2 is set in the above-described way to transfer provision information to two or less of the other devices 2 disposed in the neighborhood, the device 2A adds counter information of "TTL=2" to the provision information 1.

Furthermore, the provision information 1 includes guest data transmitted from the motion sensor 3 to the device 2A or guest data acquired by a sensor of the device 2A. The device 2B, which has received the provision information 1, can hereby provide a predetermined audio/illumination environment for the guest by controlling the actuator in accordance with a parameter included in the provision information 1.

Subsequently, in step S127, the device 2B activates the actuator (such as the illumination unit 21 and the speaker 23) of the device 2B in the same way as the device 2A, and performs audio/illumination control in accordance with the audio/illumination parameter included in the provision information 1 received from the device 2A.

Next, in step S130, the device 2B confirms that the TTL in the provision information 1 is not zero, and transfers the similar provision information 2 to the device 2C in the neighborhood on the basis of the route information in order to transfer the provision information to "two or less of the other devices 2 disposed in the neighborhood." The device 2B decrements the TTL value in the provision information 2, and sets TTL=1.

Subsequently, in step S133, the device 2C, which has received the provision information 2 from the device 2B, activates an actuator of the device 2C in the same way described in S127, and performs audio/illumination control in accordance with an audio/illumination parameter included in the provision information 2. If the device 2C decremented the TTL stored in the provision information 2, the value would be zero. Consequently, the device 2C determines that the device 2C does not have to transfer the provision information, and the provision information is not transferred to another device 2.

Subsequently, in step S136, when the guest, who has come from the entrance, moves toward the meeting room 4 and approaches the device 2B, the device 2B finds the guest on the basis of a captured image captured by the camera 22 of the device 2B.

Once the device 2B finds the guest, the device 2B reports provision information to another device 2 in the neighborhood in the same way described in S124. That is, the provision information includes an audio/illumination parameter according to the recognized guest, guest data (such as a captured image and audio data), and counter information of TTL=2. The device that will be reported is selected on the basis of the route information. Here, the device 2C and the device 2A are selected, which are neighboring stations on the route.

The device 2B transmits, in step S139, provision information 3 to the device 2C, and transmits, in step S142, provision information 4 to the device 2A.

Next, in step S145, the device 2C, which has received the provision information 3 from the device 2B, keeps the already activated actuator of the device 2C in an activated state. The device 2C confirms that, if the device 2C decremented the TTL in the received provision information 3, the TTL would not be zero. Consequently, the device 2C transfers the provision information to the next device 2D as provision information 5.

Subsequently, in step S148, the device 2D, which has received the provision information 5, activates an actuator of the device 2D in the same way described in S133, and performs audio/illumination control in accordance with an audio/illumination parameter included in the provision information 5. The device 2D determines that the provision information does not have to be transferred because the TTL would be zero if the device 2D decremented the TTL. Accordingly, the provision information is not transferred to another device 2.

Subsequently, in step S151, when the guest further moves toward the meeting room 4 and approaches the device 2C, the device 2C finds the guest on the basis of a captured image captured by the camera 22 of the device 2C. Once the device 2C finds the guest, the device 2C reports provision information to another device 2 in the neighborhood in the same way described in S139. The device that will be reported is selected on the basis of the route information. Here, the device 2D and the device 2B, which are neighboring stations on the route, are selected.

The device 2C transmits, in step S154, provision information 6 to the device 2D, and transmits, in step S157, provision information 7 to the device 2B.

Next, in step S160, the device 2B, which has received the provision information 7 from the device 2C, keeps the already activated actuator of the device 2B in an activated state. The device 2C confirms that, if the device 2C decremented the TTL in the received provision information 3, the TTL would not be zero. Consequently, the device 2C transfers the provision information to the neighboring device 2A as provision information 9.

Subsequently, in step S163, the device 2A recognizes that the device 2A is positioned at an edge of a service which is currently provided because the TTL in the provision information 9 would be zero if the device 2A decremented the TTL. In addition, the device 2A stops the actuator that is currently in an activated state.

Meanwhile, in step S166, the device 2D, which has received the provision information 6 from the device 2C, keeps the already activated actuator of the device 2D in an activated state. The device 2D confirms that, if the device 2D decremented the TTL in the received provision information 6, the TTL would not be zero. Consequently, the device 2D transfers the provision information to the neighboring devices 2E and 2F in the meeting room 4 as provision information 8.

In step S169, when each of the devices 2E and 2F receives the provision information 8, each of the devices 2E and 2F activates an actuator of each of the devices 2E and 2F in the same way described in S127, and performs audio/illumination control in accordance with the audio/illumination parameter included in the provision information 8. Each of the devices 2E and 2F determines on the basis of the route information that each of the devices 2E and 2F does not have to transfer the provision information because each of the devices 2E and 2F is positioned at the destination (final address) of the guest.

As above, the first embodiment has been described in detail. According to the first embodiment, the audio/illumination control system according to the present embodiment can provide an audio/illumination environment according to a guest to each of the multiple devices 2 (audio illumination apparatuses) by having the multiple devices 2 cooperate with each other.

The audio/illumination control system according to the present embodiment may also limit a transfer range of provision information including an audio/illumination parameter to another neighboring device 2 on the route according to the number of transfer and a destination of a guest. Accordingly, the multiple devices 2 in the neighborhood of a guest can provide an audio/illumination environment in accordance with a destination of the guest in cooperation with each other.

(Supplement)

Here, the above-described first embodiment will be supplemented. In the first embodiment, a transfer range (transmission range) of an audio/illumination parameter is limited to two or less of the other devices 2, as an example. However, the transfer range (transmission range) may be additionally limited in accordance with priority of a user, which will be specifically described with reference to FIG. 6.

Figure 6:
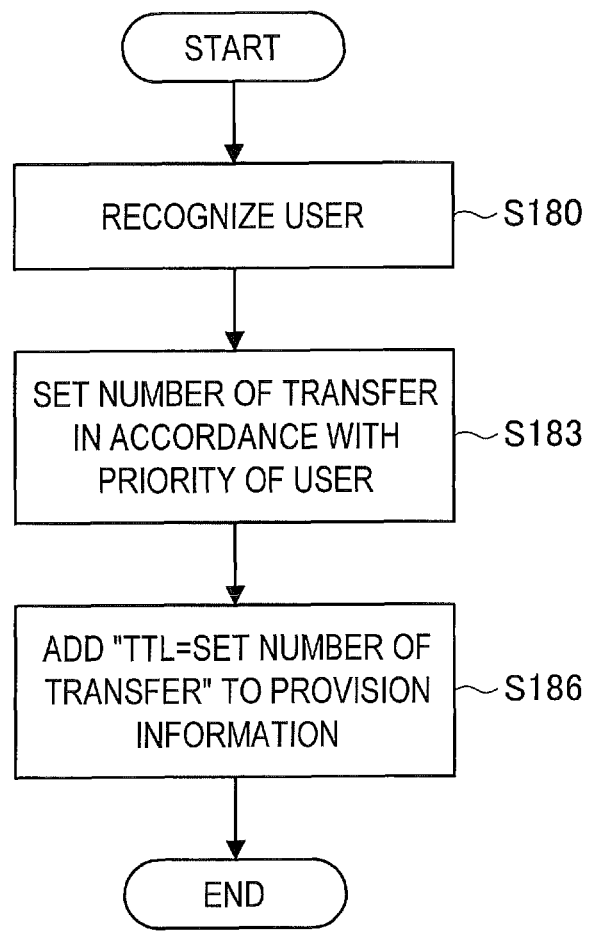
FIG. 6 is a flowchart illustrating a process of setting a transmission range according to the first embodiment, the transmission range being set to be limited in accordance with priority of a user.

FIG. 6 is a flowchart illustrating a process of setting a transfer range to be limited in accordance with priority of a user. As illustrated in FIG. 6, first, in step S180, the user recognition unit 261 of the device 2 recognizes who a user in the neighborhood of the device 2 is, on the basis of data acquired from a sensor.

Next, in step S183, the CPU 26 of the device 2 applies setting in accordance with priority of the user recognized by the user recognition unit 261 such that a parameter is transferred more times as priority of the user is higher. The priority of a user may be based on, for example, whether the user is a guest or a worker for the company, whether the user is registered or not, how old the user is, and what kind of post the user holds in the company.

In step S186, the CPU 26 of the device 2 adds "TTL=the set number of transfer" to provision information along with an audio/illumination parameter. Consequently, when a user having higher priority such as a user holding a higher post in the company comes, more of the devices 2 can cooperate with each other and provide an audio/illumination environment according to the user.

3. Second Embodiment

In the above-described first embodiment, when the multiple devices 2 perform data communication with each other to form a mesh network, the devices 2 recognize a user and extract information necessary for controlling an actuator from each memory 27 of the devices 2. However, the audio/illumination control system according to the embodiments of the present disclosure is not limited thereto. For example, a user may be recognized on a server, and information necessary for controlling an actuator may also be extracted from the server. Next, with reference to FIGS. 7 to 10, an audio/illumination control system according to a second embodiment will be specifically described that includes a mesh network which includes such a server and multiple devices 2.

Figure 7:
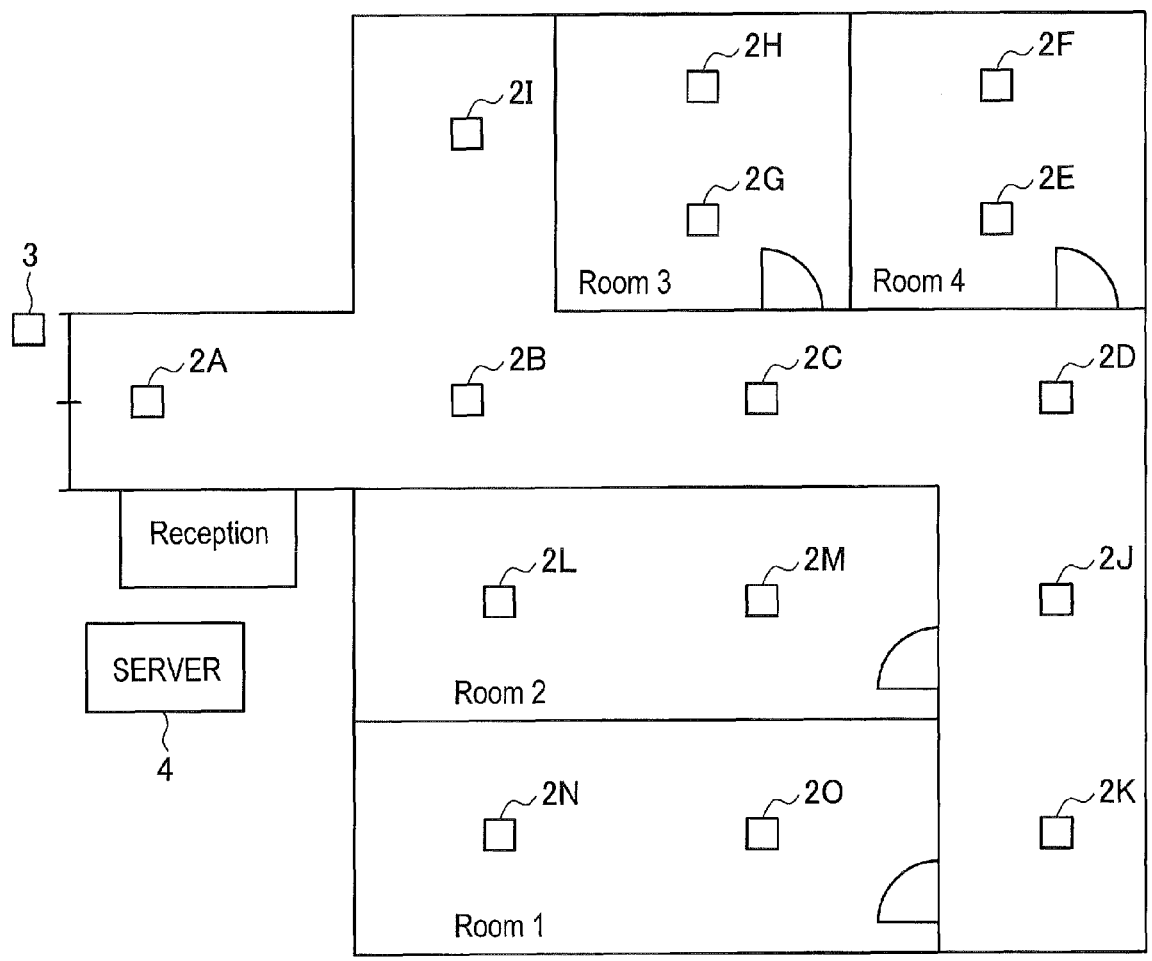
FIG. 7 is a diagram for describing an example of disposition positions of a server and multiple devices 2 according to a second embodiment.

FIG. 7 is a diagram for describing an example of disposition positions of a server and multiple devices 2 according to the second embodiment. As illustrated in FIG. 7, an audio/illumination control system according to the second embodiment includes a server 4 and devices 2A to 2O. The device 2 may substitute for a motion sensor 3 illustrated in FIG. 7 in the same way described in the first embodiment. The audio/illumination control system according to the present embodiment does not necessarily have to include the motion sensor 3.

The devices 2A to 2O and the motion sensor 3 are each connected to the server 4 through wired connection.

The server 4 has a user recognition function corresponding to the user recognition unit 261 according to the first embodiment, and a storage unit corresponding to the memory 27 according to the first embodiment. That is, the storage unit of the server 4 stores, for example, user recognition information such as a face image, a name and quality of a voice of a registered user, audio/illumination information according to a preference of the user, information indicating a destination (which meeting room) of the user, and information indicating age and a post in the company of the user.

The server 4 can hereby recognize who a guest (user) is, on the basis of guest data (such as a captured image and audio data) transmitted from the device 2. The server 4 can also extract, for example, an audio/illumination parameter according to the recognized guest (according to a preference of the guest, for example), and even information indicating where the guest is going. The server 4 transmits the extracted information to the device 2.

The device 2 sets an audio/illumination parameter on the basis of the information extracted by the server 4, and can provide an audio/illumination environment according to the guest.

Additionally, in the example illustrated in FIG. 7, the server 4 is disposed near reception. However, the disposition position of the server 4 is not particularly limited. The server 4 may be disposed on another floor or outside the building.

3-1. Configuration Example of Device

Next, a configuration example of the device 2 according to the present embodiment will be described. The device 2 according to the present embodiment has the same configuration as the configuration illustrated in FIG. 3 other than the CPU 26. Next, with reference to FIG. 8, a CPU 26' according to the present embodiment, which is different from the CPU according to the first embodiment, will be described.

Figure 8:
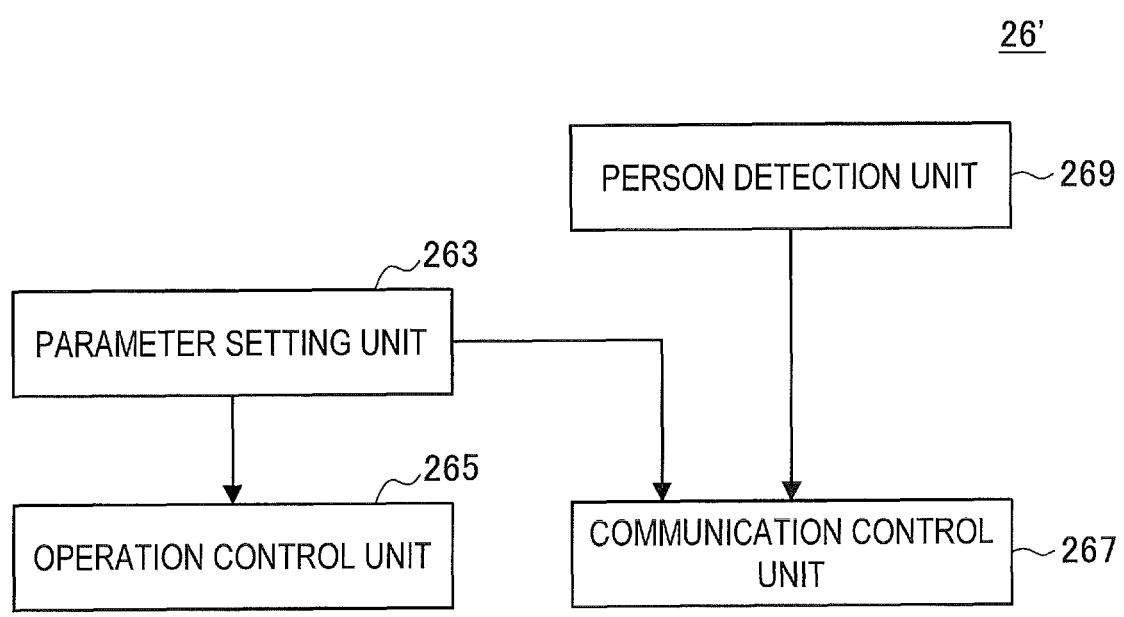
FIG. 8 is a block diagram illustrating a functional configuration of a CPU according to the second embodiment.

FIG. 8 is a block diagram illustrating a functional configuration of the CPU 26' according to the present embodiment. As illustrated in FIG. 8, the CPU 26' according to the present embodiment functions as a parameter setting unit 263, an operation control unit 265, a communication control unit 267, and a person detection unit 269.

The person detection unit 269 detects a person (finds a guest) on the basis of data continuously acquired by a sensor of the device 2. For example, the person detection unit 269 detects a person in accordance with whether a captured image captured by a camera 22 includes a face region, or whether audio data collected by a Mic 24 includes a voice of the person and a footstep of the person. The person detection unit 269 may detects a person by collecting, through the Mic 24, sounds reflected on sounds output from the speaker 23.

If the person detection unit 269 detects a person, the communication control unit 267 transmits the data acquired by the sensor to the server 4 as guest data. Accordingly, the device 2 can transmits only sensor data necessary for recognizing the user to the server 4. The communication control unit 267 transmits, to another device 2 in the neighborhood via the server 4, an audio/illumination parameter and the like set by the parameter setting unit 263.

The parameter setting unit 263 sets a parameter for controlling an actuator, on the basis of the audio/illumination information received from the server 4. As described above, the audio/illumination information transmitted from the server 4 is audio/illumination information according to the recognized user (guest).

In the same way described in the first embodiment, the operation control unit 265 controls an operation of an actuator such as the speaker 23 and the illumination unit 21 in accordance with the audio/illumination parameter set by the parameter setting unit 263.

As above, the functional configuration of the CPU 26' according to the present embodiment has been described. Additionally, memory 27 of the device 2 according to the present embodiment stores various programs for operating the CPU 26'.

3-2. Operational Process

Next, with reference to FIGS. 9 to 10, an operational process of the audio/illumination control system according to the second embodiment will be described.

Figure 9:
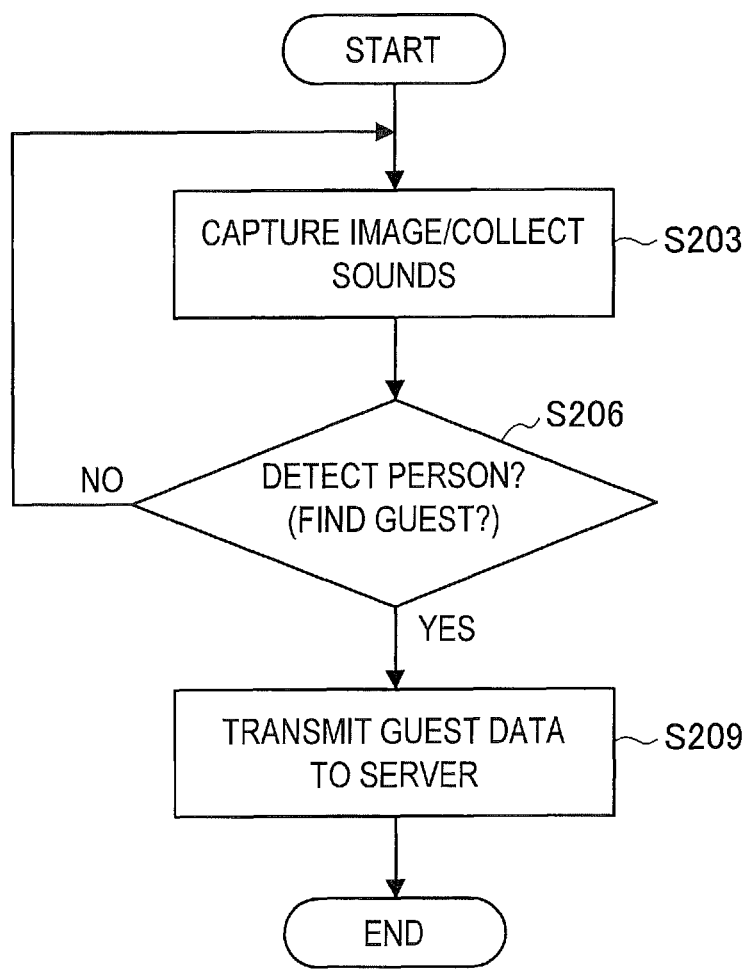
FIG. 9 is a flowchart illustrating a guest finding process of a device according to the second embodiment.

FIG. 9 is a flowchart illustrating a guest finding process performed by the device 2. As illustrated in FIG. 9, first, in step S203, the device 2 continuously captures an image and collects sounds through the camera 22 and the Mic 24, respectively.

Next, in step S206, the person detection unit 269 of the device 2 continuously detects a person (finds a guest) who is in the neighborhood of the device 2, on the basis of the captured image and the audio data.

Next, if a person is detected (S206/Yes), the communication control unit 267 of the device 2 transmits, in step S209, the captured image and the audio data used for detecting the person to the server 4 as guest data.

As above, the device 2 according to the present embodiment can transmit only sensor data necessary for recognizing the user to the server 4. Subsequently, with reference to FIG. 10, an operational process of the entire system will be described.

Figure 10:
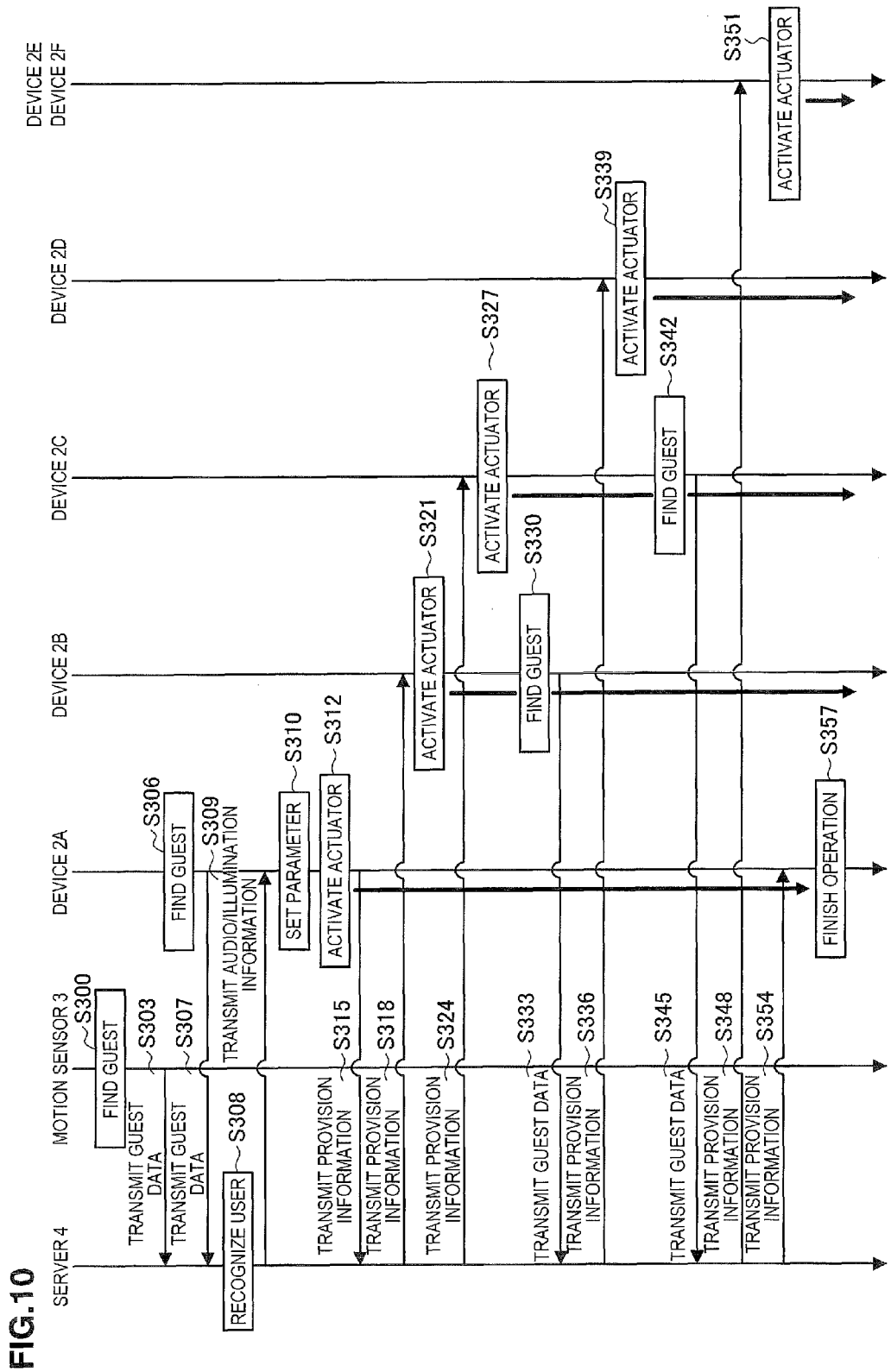
FIG. 10 is a flowchart illustrating an operational process of an audio/illumination control system according to the second embodiment.

FIG. 10 is a flowchart illustrating an operational process of the audio/illumination control system according to the second embodiment. Additionally, each of the devices 2A to 2O continuously performs the guest finding process that has been described above with reference to FIG. 9. Let us assume here that the device 2A of the devices 2A to 2O first finds a guest and transmits an audio/illumination parameter according to the guest to another device 2 via the server 4.

As illustrated in FIG. 10, first, in S300, the motion sensor 3 continuously captures an area near the entrance, and detects a person (finds a guest) on the basis of the captured image. Additionally, the motion sensor 3 may continuously collect sounds in the neighborhood to find the guest on the basis of the audio data. Alternatively, the motion sensor 3 may use infrared radiation to find the guest.

Subsequently, in step S303, the motion sensor 3 transmits guest data (such as a captured image) of the found guest to the sever 4.

Next, in step S306, the person detection unit 269 of the device 2A finds the guest, who has come from the entrance, on the basis of the captured image continuously captured by the camera 22.

Subsequently, in step S307, the device 2A transmits guest data (such as a captured image) of the found guest to the server 4.

Subsequently, in step S308, the server 4 recognizes who the guest (user) is, on the basis of the guest data received from the motion sensor 3 and the guest data received from the device 2A.

Next, in step S309, the server 4 extracts, from the storage unit of the device, information (audio/illumination information) indicating what kind of sounds and illumination is output for the recognized guest, and transmits the information to the device 2A. The server 4 may also extract, from the storage unit of the device, information indicating a destination of the recognized guest (the recognized guest is going to the meeting room 4, for example), and transmit the information to the device 2A.

Subsequently, in step S310, the parameter setting unit 263 of the device 2A sets an audio/illumination parameter according to the guest in accordance with the audio/illumination information received from the server 4.

Next, in step S312, the operation control unit 265 of the device 2A activates an actuator (such as the illumination unit 21 and the speaker 23) of the device 2A, and controls an operation of the actuator in accordance with the parameter set by the parameter setting unit 263. Accordingly, the device 2A can output sounds and illumination according to the guest.

Next, in step S315, the communication control unit 267 of the device 2A transmits, to another device 2 in the neighborhood via the server 4 as provision information, the audio/illumination parameter set by the parameter setting unit 263 along with a command for activating an actuator. The communication control unit 267 may transmit provision information to another device 2 on the route according to a destination of the guest. For example, if a destination of a guest is the meeting room 4, it is found that the guest passes under the device 2A, the device 2B, the device 2C, the device 2D, the device 2E, and the device 2F. Accordingly, the device 2A transfers provision information to the device 2B, the device 2C, the device 2D, the device 2E and the device 2F so that an audio/illumination environment according to the guest can be provided along the route of the guest.

Furthermore, the communication control unit 267 may set how many other devices 2 provision information is transferred to. For example, actuators in a limited predetermined range such as two devices in the neighborhood of a guest are activated/deactivated, and an audio/illumination environment according to the guest can be provided in the predetermined range.

Let us assume here as an example that actuators in a limited range of two devices in the neighborhood of a guest are set to be activated/deactivated on the route to the meeting room 4. Thus, first of all, as described below, the server 4 transfers, to the two devices 2B and 2C, the provision information received from the device 2A (S318 and S324). Thereafter, the server 4 transfers the provision information to two devices in the neighborhood of the guest one by one in accordance with the movement of the guest (S336 and S348).

As described above, in step S318, the server 4 transfers, to the device 2B, the provision information received from the device 2A.

Next, in step S321, the device 2B activates an actuator (such as the illumination unit 21 and the speaker 23) of the device 2B, and performs audio/illumination control in accordance with an audio/illumination parameter included in the provision information.

As described above, in step S324, the server 4 transfers, to the device 2C, the provision information received from the device 2A.

Subsequently, in step S327, the device 2C activates an actuator (such as the illumination unit 21 and the speaker 23) of the device 2C, and performs audio/illumination control in accordance with an audio/illumination parameter included in the provision information.

Next, in step S330, when the guest, who has come from the entrance, moves toward the meeting room 4 and approaches the device 2B, the device 2B finds the guest on the basis of a captured image captured by the camera 22 of the device 2B.

Subsequently, in step S333, when the device 2B finds the guest on the basis of guest data included in the provision information received in S318, the device 2B transmits guest data (such as a captured image) of the found guest to the server 4 in the same way described in S307.

Subsequently, in step S336, the server 4 transmits provision information to the device 2D in order to activate actuators in a range of two devices in the neighborhood of the guest. Additionally, here, the two devices in the neighborhood of the guest refer to the devices 2C and 2D. The server 4 has already transmitted the provision information to the device 2C in S324, and activated the actuators. The server 4 therefore transmits the provision information to only the device 2D.

Next, in step S339, the device 2D activates an actuator (such as the illumination unit 21 and the speaker 23) of the device 2D, and performs audio/illumination control in accordance with an audio/illumination parameter included in the provision information.

Subsequently, in step S342, when the guest further moves toward the meeting room 4 and approaches the device 2C, the device 2C finds the guest on the basis of a captured image captured by the camera 22 of the device 2C.

Next, in step S345, once the device 2C finds the guest on the basis of guest data included in the provision information received in S324, the device 2C transmits guest data (such as a captured image) of the found guest to the server 4.

Subsequently, in step S348, the server 4 transmits provision information to the devices 2E and 2F in order to activate actuators in a range of two devices in the neighborhood of the guest. Additionally, here, the two devices in the neighborhood of the guest refer to the devices 2D and 2E. Since the device 2E is disposed in the meeting room 4, which is the destination of the guest, and the device 2F is also disposed in the meeting room, the provision information is also transmitted to the device 2F.

Next, in step S351, each of the devices 2E and 2F activates an actuator (such as the illumination unit 21 and the speaker 23) of each of the devices 2E and 2F, performs audio/illumination control in accordance with an audio/illumination parameter included in the provision information.

Subsequently, in step S354, the server 4 recognizes that the device 2A is positioned at an edge of a service that is currently provided, by receiving guest data from the device 2C, and transmits end information for finishing an operation of an actuator of the device 2A.

In step S357, the device 2A, which has received the end information from the server 4, stops the actuator that is currently in an activated state.

4. Conclusion

As above, the audio/illumination control system according to the present embodiment can provide an audio/illumination space according to an individual user by having multiple audio illumination apparatuses cooperate with each other.

It should be understood by those skilled in the art that various modifications, combinations, sub-combinations and alterations may occur depending on design requirements and other factors insofar as they are within the scope of the appended claims or the equivalents thereof.

For example, a guest is found on the basis of data acquired by the device 2 through the camera 22 and the Mic 24 in each embodiment. However, a method of finding a guest according to the present embodiment is not limited thereto. For example, radio frequency identification (RFID) may be used. Specifically, the device 2 may find a guest and recognize who the guest is by reading out data of an RFID tag that is assigned to the guest.

The device 2 may also switch an audio/illumination parameter according to a preference of a user in accordance with an environment (such as a place and time).

If the device 2 recognizes multiple users, the device 2 may set multiple actuators of the device 2 as parameters according to the respective users. For example, if the device 2 recognizes a user A and a user B, the device 2 sets an illumination parameter in accordance with the user A and an audio parameter in accordance with the user B.

The device 2 may also set an audio/illumination parameter in accordance with walking speed of a recognized user. The walking speed of the user can be estimated when, for example, multiple captured images are chronologically acquired. For example, as audio/illumination parameter setting according to the walking speed, the device 2 changes pitch and flashing speed of music in accordance of walking pitch, or selects a song and an illumination pattern that match with the walking speed from user's preferred sounds/illumination.

An actuator is activated/deactivated in accordance with movement of a guest in an operational process in each embodiment described with reference to FIGS. 5 and 10. However, the audio/illumination control system according to the present embodiment is not limited thereto. When a guest is not recognized (before an actuator is activated or after an operation is finished, which are illustrated in FIGS. 5 and 10), each device 2 may be performing audio/illumination control set by default.

In addition to the illumination unit 21 and the speaker 23, an actuator of the device 2 may be an actuator that can output scent, vibration (tactile sense), or wind pressure. Accordingly, the device 2 can output scent, vibration (tactile sense), or wind pressure according to a user.

Additionally, the present technology may also be configured as below:

(1) An audio illumination apparatus including:
    an illumination unit;
    an audio output unit;

a setting unit configured to set a parameter of at least one of illumination of the illumination unit and audio output of the audio output unit in accordance with a recognized user who is in a neighborhood;

a transmission unit configured to transmit the parameter set by the setting unit to an audio illumination apparatus in the neighborhood; and a control unit configured to control the at least one of the illumination of the illumination unit and the audio output of the audio output unit in accordance with the set parameter.

(2) The audio illumination apparatus according to (1), wherein the transmission unit transmits the parameter in a transmission range according to priority of the user.

(3) The audio illumination apparatus according to (1) or (2), wherein the transmission unit transmits the parameter to another audio illumination apparatus disposed on a route according to a destination of the user.

(4) The audio illumination apparatus according to any one of (1) to (3), further including:
an imaging unit;
wherein, when a person is detected, the control unit performs control in a manner that a captured image captured by the imaging unit is transmitted to a server.

(5) The audio illumination apparatus according to (4), further including:
a detection unit configured to detect a person based on the captured image captured by the imaging unit.

(6) The audio illumination apparatus according to any one of (1) to (5), further including:
a sound collection unit,
wherein, when a person is detected, the control unit performs control in a manner that audio data collected by the sound collection unit to a server.

(7) The audio illumination apparatus according to (6), further including:
a detection unit configured to detect a person based on a sound reflected on a sound output from the audio output unit.

(8) The audio illumination apparatus according to (6), further including:
a detection unit configured to detect a person based on a footstep or a voice of the person collected by the sound collection unit.

(9) The audio illumination apparatus according to any one of (1) to (8),
wherein the setting unit sets at least one of an illumination pattern, a color, and a luminous intensity as an illumination parameter of the illumination unit according to the user.

(10) The audio illumination apparatus according to any one of (1) to (9),
wherein the setting unit sets at least one of a timbre, sound intensity, pitch, a tempo, and equalizing as a parameter of the audio output of the audio output unit according to the user.

(11) The audio illumination apparatus according to any one of (1) to (9),
wherein the setting unit sets a genre of music or a specific composition as a parameter of the audio output of the audio output unit according to the user.

(12) The audio illumination apparatus according to any one of (1) to (10),
wherein the setting unit sets directivity of the audio output unit as a parameter of the audio output of the audio output unit according to the user.

(13) The audio illumination apparatus according to any one of (1) to (10),
wherein the setting unit sets a sound volume of the audio output unit as a parameter of the audio output of the audio output unit according to the user.

(14) The audio illumination apparatus according to any one of (1) to (11),
wherein the setting unit sets at least one of an illumination parameter and an audio output parameter in accordance with a preference of the recognized user, the preference having been registered in advance.

(15) The audio illumination apparatus according to any one of (1) to (14), further including:
a recognition unit configured to recognize the user who is in the neighborhood of the audio illumination apparatus.

(16) The audio illumination apparatus according to (15),
wherein the recognition unit recognizes the user by performing face recognition based on a captured image obtained by an imaging unit capturing an area in the neighborhood.

(17) The audio illumination apparatus according to (15) or (16),
wherein the recognition unit recognizes the user by performing sound recognition or speaker recognition based on sound collection data obtained by the sound collection unit collecting a sound in the neighborhood.

(18) The audio illumination apparatus according to any one of (15) to (17),
wherein the recognition unit recognizes the user by performing authentication based on ID information acquired from a wireless tag.

(19) The audio illumination apparatus according to any one of (1) to (18),
wherein the parameter includes a time code, and
wherein the control unit starts at least one of the illumination or the audio output in accordance with the time code, or performs control in a manner that the illumination or the audio output synchronizes.

(20) A non-transitory computer readable storage medium having a program stored therein, the program causing a computer to function as:
an illumination unit;
an audio output unit;
a setting unit configured to set a parameter of at least one of illumination of the illumination unit and audio output of the audio output unit in accordance with a recognized user who is in a neighborhood;
a transmission unit configured to transmit the parameter set by the setting unit to an audio illumination apparatus in the neighborhood; and
a control unit configured to control the at least one of the illumination of the illumination unit and the audio output of the audio output unit in accordance with the set parameter.

What is claimed is:
1. A first audio illumination apparatus, comprising:
an illumination unit;
an audio output unit;
a setting unit configured to set a parameter of at least one of illumination of the illumination unit or audio output of the audio output unit in accordance with a recognized user who is in a neighborhood of the first audio illumination apparatus;
a transmission unit configured to transmit the parameter set by the setting unit to a number of second audio illumination apparatuses disposed on a route of the recognized user; and
a control unit configured to:

control the at least one of the illumination of the illumination unit or the audio output of the audio output unit in accordance with the set parameter; and
determine, based on a priority assigned to the recognized user, the number of second audio illumination apparatuses disposed on the route of the recognized user to which the parameter is to be transmitted.

2. The first audio illumination apparatus according to claim 1, wherein the route of the recognized user is determined in accordance with a destination of the recognized user.

3. The first audio illumination apparatus according to claim 1, further comprising:
an imaging unit,
wherein, in an event a person is detected, the control unit is configured to control the transmission unit to transmit an image captured by the imaging unit to a server.

4. The first audio illumination apparatus according to claim 3, further comprising:
a detection unit configured to detect the person based on the image captured by the imaging unit.

5. The first audio illumination apparatus according to claim 1, further comprising:
a sound collection unit,
wherein, in an event a person is detected, the control unit is configured to control the transmission unit to transmit an audio data collected by the sound collection unit to a server.

6. The first audio illumination apparatus according to claim 5, further comprising:
a detection unit configured to detect the person based on a sound reflected on a sound output from the audio output unit.

7. The first audio illumination apparatus according to claim 5, further comprising:
a detection unit configured to detect the person based on a footstep or a voice of the person collected by the sound collection unit.

8. The first audio illumination apparatus according to claim 1, wherein the setting unit is configured to set at least one of an illumination pattern, a color, or a luminous intensity as the parameter of the illumination unit in accordance with the recognized user.

9. The first audio illumination apparatus according to claim 1, wherein the setting unit is configured to set at least one of a timbre, a sound intensity, a pitch, a tempo, or equalization as the parameter of the audio output of the audio output unit in accordance with the recognized user.

10. The first audio illumination apparatus according to claim 1, wherein the setting unit is configured to set a genre of music or a specific composition as the parameter of the audio output of the audio output unit in accordance with the recognized user.

11. The first audio illumination apparatus according to claim 1, wherein the setting unit is configured to set directivity of the audio output unit as a parameter of the audio output of the audio output unit in accordance with the recognized user.

12. The first audio illumination apparatus according to claim 1, wherein the setting unit is configured to set a sound volume of the audio output unit as the parameter of the audio output of the audio output unit in accordance with the recognized user.

13. The first audio illumination apparatus according to claim 1, wherein the setting unit is configured to set the parameter in accordance with a preference of the recognized user, wherein the preference is registered in advance.

14. The first audio illumination apparatus according to claim 1, further comprising:
a recognition unit configured to recognize the user who is in the neighborhood of the first audio illumination apparatus.

15. The first audio illumination apparatus according to claim 14, further comprising an imaging unit configured to capture an area in the neighborhood, wherein the recognition unit is configured to recognize the user by face recognition based on a captured image obtained by the imaging unit.

16. The first audio illumination apparatus according to claim 14, further comprising a sound collection unit configured to collect a sound in the neighborhood, wherein the recognition unit is configured to recognize the user by sound recognition or speaker recognition based on sound collection data obtained by the sound collection unit.

17. The first audio illumination apparatus according to claim 14, wherein the recognition unit is configured to recognize the user by authentication based on ID information acquired from a wireless tag.

18. The first audio illumination apparatus according to claim 1,
wherein the parameter includes a time code, and
wherein the control unit is configured to start at least one of the illumination or the audio output in accordance with the time code, or control the illumination unit and the audio output unit in a manner that the illumination and the audio output is synchronized.

19. A non-transitory computer-readable storage medium having a set of computer-executable instructions that, in an event of execution by a computer, causes the computer to perform an operation to control a first audio illumination apparatus, comprising:
setting a parameter of at least one of illumination of an illumination unit of the first audio illumination apparatus or audio output of an audio output unit of the first audio illumination apparatus in accordance with a recognized user who is in a neighborhood of the first audio illumination apparatus;
determining, based on a priority of the recognized user, a number of second audio illumination apparatuses disposed on a route of the recognized user to which the set parameter is to be transmitted;
transmitting the set parameter to the determined number of second audio illumination apparatuses disposed on the route of the recognized user; and
controlling the at least one of the illumination of the illumination unit or the audio output of the audio output unit in accordance with the set parameter.

* * * * *